US011755793B2

(12) United States Patent
Nizami et al.

(10) Patent No.: US 11,755,793 B2
(45) Date of Patent: *Sep. 12, 2023

(54) SUB FIELD MOISTURE MODEL IMPROVEMENT USING OVERLAND FLOW MODELING WITH SHALLOW WATER COMPUTATIONS

(71) Applicant: Climate LLC, Saint Louis, MO (US)

(72) Inventors: Asra Nizami, San Francisco, CA (US); Jennifer Holt, San Francisco, CA (US); Robert Ewing, San Francisco, CA (US); Steven De Gryze, San Francisco, CA (US); John Gates, Alameda, CA (US); Harish Sangireddy, San Francisco, CA (US); John Browning Burdick, Sammamish, WA (US); Michael S. Byrns, Seattle, WA (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,483

(22) Filed: Nov. 17, 2021

(65) Prior Publication Data

US 2022/0237340 A1 Jul. 28, 2022

Related U.S. Application Data

(63) Continuation of application No. 16/555,267, filed on Aug. 29, 2019, now Pat. No. 11,182,521.
(Continued)

(51) Int. Cl.
*G05B 19/042* (2006.01)
*G06F 30/20* (2020.01)
(Continued)

(52) U.S. Cl.
CPC ............ *G06F 30/20* (2020.01); *A01B 79/005* (2013.01); *A01C 21/005* (2013.01); *A01D 75/00* (2013.01);
(Continued)

(58) Field of Classification Search
CPC ... A01B 79/005; A01C 21/005; A01C 21/007; A01D 75/00; A01G 25/16; G05B 15/02;
(Continued)

(56) References Cited

U.S. PATENT DOCUMENTS 6,401,041 B1   6/2002  Petersen
9,519,861 B1   12/2016 Gates et al.
(Continued)

OTHER PUBLICATIONS

Wu et al. "Delineating Wetland Catchments and Modeling Hydrologic Connectivity Using Lidar Data and Aerial Imagery"., In Hydrol Earth Syst Sci dated Jul. 14, 2017, 30 pages.

*Primary Examiner* — Yuhui R Pan
(74) *Attorney, Agent, or Firm* — Harness, Dickey & Pierce, P.L.C.

(57) ABSTRACT

Subfield moisture model improvement in generating overland flow modeling using shallow water calculations and kinematic wave calculations is disclosed. In an embodiment, a computer-implemented data processing method comprises: receiving precipitation data and infiltration data for an agricultural field; obtaining surface water depth data, surface water velocity data, and surface water discharge data for the same agricultural field; determining subfield geometry data for the agricultural field; executing a plurality of water calculations and wave calculations using the subfield geometry data to generate an overland flow model that includes moisture levels for the agricultural field; based on, at least in part, the overland flow model, generating and causing displaying a visual graphical image of the agricultural field comprising a plurality of color pixels having color
(Continued)

values corresponding to the moisture levels determined for the agricultural field. Output of the overland flow model is provided to control computers of seeders, planters, fertilizer spreaders, harvesters, or combines to control seeding, planting, fertilizing or irrigation activities in the field.

24 Claims, 12 Drawing Sheets

Related U.S. Application Data

(60) Provisional application No. 62/725,884, filed on Aug. 31, 2018.

(51) Int. Cl.
*G06T 11/00* (2006.01)
*A01C 21/00* (2006.01)
*A01B 79/00* (2006.01)
*A01D 75/00* (2006.01)
*A01G 25/16* (2006.01)
*G06F 111/10* (2020.01)

(52) U.S. Cl.
CPC .......... *A01G 25/16* (2013.01); *G05B 19/042* (2013.01); *G06T 11/001* (2013.01); *G05B 2219/2625* (2013.01); *G06F 2111/10* (2020.01)

(58) Field of Classification Search
CPC .......... G05B 19/042; G05B 2219/2625; G06F 2111/10; G06F 30/20; G06Q 10/06; G06Q 50/02; G06T 11/001
See application file for complete search history.

(56) References Cited

U.S. PATENT DOCUMENTS

| | | |
|---|---|---|
| 11,182,521 B2 | 11/2021 | Nizami et al. |
| 2001/0036295 A1 | 11/2001 | Hendrickson et al. |
| 2005/0273300 A1 | 12/2005 | Patwardhan et al. |
| 2008/0202777 A1 | 8/2008 | Corcoran |
| 2011/0290478 A1 | 12/2011 | Sun et al. |
| 2015/0019262 A1 | 1/2015 | Du et al. |
| 2016/0302351 A1 | 10/2016 | Schildroth et al. |
| 2016/0309646 A1 | 10/2016 | Starr et al. |
| 2017/0041407 A1 | 2/2017 | Wilbur et al. |
| 2018/0017710 A1 | 1/2018 | Beck et al. |

SUB FIELD MOISTURE MODEL IMPROVEMENT USING OVERLAND FLOW MODELING WITH SHALLOW WATER COMPUTATIONS

BENEFIT CLAIM

This application claims the benefit under 35 U.S.C. § 120 as a continuation of application Ser. No. 16/555,267, filed Aug. 29, 2019, which claims the benefit under 35 U.S.C. § 119(e) of provisional application 62/725,884, filed Aug. 31, 2018, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2021 The Climate Corporation.

FIELD OF THE DISCLOSURE

One technical field of the present disclosure is computer-assisted visualization of geophysical data in the field of agriculture, including visualization of overland water flows based on subfield moisture models generated for agricultural fields at the subfield scale. Another technical field is computer-implemented techniques for executing shallow water calculations and kinematic wave calculations over digital elevation model data to generate subfield moisture models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Variations in soil moisture in subfield regions of agricultural fields may cause variations in nutrient levels in the fields and thus variations in patterns in crop yields. While many computer-based tools have been already developed for monitoring the nutrient levels in the soil, the tools usually rely on low-granularity topographical maps of the fields, and therefore the nutrient level maps generated by the tools can only provide low-granularity information.

Examples of low-granularity topographical maps are the maps that depict fields at a zone-based resolution. A zone is usually a non-uniform agricultural area that may be inconsistent in nature and may include several subfields having, for example, distinct water retention characteristics and different irrigation layouts. A zone usually includes several subfields. Thus, a subfield-based map is usually a higher-granularity map than a zone-based map.

Nutrient level maps determined at a zone level may be inadequate because the crop growers might prefer receiving the maps generated at a subfield level. maps generated at a zone level, but not at a subfield level, cannot adequately capture hydrologic differences between the subfields within a zone. This is especially the case because individual zones tend to lie within a narrow elevation range: there is little overland flow within a zone, but a lot between neighboring zones. The zone-based maps are therefore unlikely to capture, for example, subfield-specific information about the amounts of nitrogen washed out by the water flowing through the individual subfields or the nitrogen levels in the individual subfields.

Thus, there is a need for a tool that is configured to generate a subfield-based soil moisture model for a high-granularity topographical map of an agricultural field, and that can be used to determine hydrologic fluxes, soil moisture levels and nutrient levels for a high-granularity map of the field.

SUMMARY

The appended claims may serve as a summary of the disclosure.

BRIEF DESCRIPTION OF THE DRAWINGS

In the drawings:

FIG. 6 depicts an example embodiment of a spreadsheet view for data entry.

DETAILED DESCRIPTION

Figure 1:
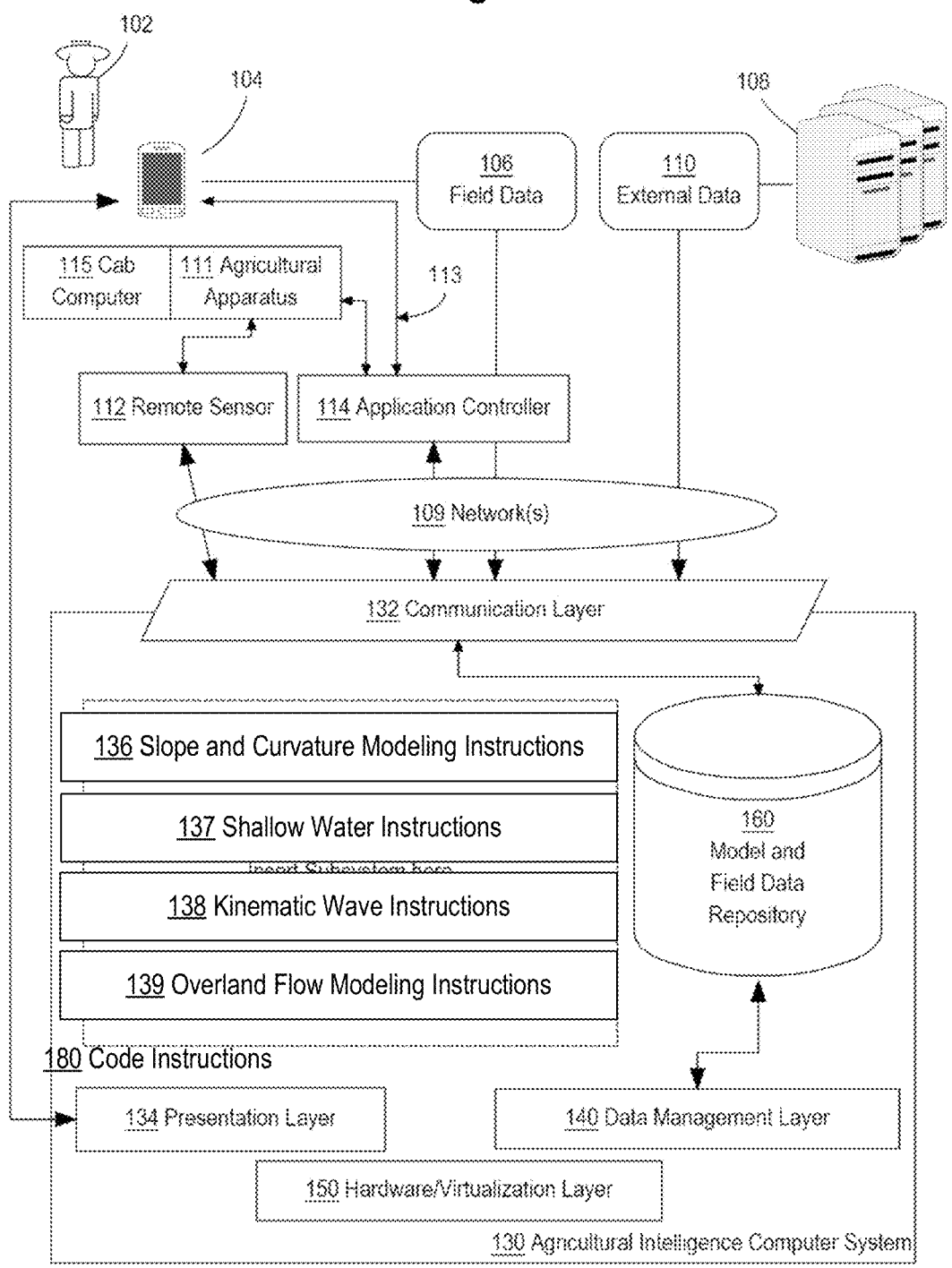
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. IMPROVED SUBFIELD MOISTURE MODELING TECHNIQUES
   3.1. OVERLAND FLOW MODELS FOR AGRICULTURAL FIELDS
   3.2. PRECIPITATION AND INFILTRATION DATA
   3.3. TOPOGRAPHY PROCESSING
4. EXAMPLE APPLICATIONS
5. BENEFITS OF CERTAIN EMBODIMENTS
6. EXTENSIONS AND ALTERNATIVES 1. General Overview In an embodiment, an approach and a tool are described for generating a subfield-based soil moisture model from a high-granularity topographical map of an agricultural field. The subfield-based soil moisture model may be used in agricultural applications to, for example, predict hydrologic fluxes in the subfields of the field, and to determine soil moisture and nutrient levels at the field-pixel level of the field.

Subfield variations in soil moisture in agricultural fields are known to cause spatially varying leaching of nutrients in the fields and variations in patterns in crop yields. Therefore, to accurately determine or predict the crop yields, the variations in soil moisture need to be captured per subfields and based on high-granularity maps of the fields.

Water contributions from subfield overland flows and shallow water table flows in a field may significantly alter, for example, nitrogen levels in the soil. While the overland flows often provide same-day redistribution of water across the field, the shallow water tables often provide multiple-day redistribution of the water. Because the overland flows and the shallow water tables impact the soil moisture distribution and nitrogen level distribution differently over time, the time-dependent differences between the overland flows and the shallow water tables need to be modeled accurately.

In an embodiment, an approach allows modeling subfield flows in an agricultural field. The approach provides improvements over the conventional approaches because it involves fewer computation and storage resources than the conventional approaches. The approach allows generating a subfield moisture model and using the generated model to determine moisture levels for a high-granularity topographical map of the field.

In an embodiment, a method and a system allow modeling overland flows by using the highest-resolution elevation data available for a field. The models of the overland flows may be used to generate graphical representations of the flows. The graphical representations of the flows may be used by crop growers to optimize the agricultural practices for the field to achieve the highest possible yield. The models may be also used to predict the dynamic spatial extent of the runoff water production and water transfer for the field. The predicted information may be used to help the crop growers to, for example, adjust soil fertilizer dosages and fertilization schedules.

In an embodiment, an approach allows determining dynamic spatial characteristics of runoff water production and water transfer for an agricultural field. The characteristics are determined based on mathematical models derived by solving mathematical equations over topographical data, soil data, soil moisture data, and precipitation data.

Mathematical equations used to determine spatial characteristics of the runoff water production and water transfer in an agricultural field may include shallow water equations and kinematic wave equations. The equations are generally nonlinear, and therefore, finite difference and finite volume numerical methods may be used to solve the equations. The derived solutions are used to determine the spatial characteristics for the runoff water production and water transfer in the field.

Subfield geometry for an agricultural field may be generated based on an input topographical (elevation) dataset provided for the field. The subfield geometry and the spatial characteristics may be used to determine surface water depths, water flow velocities, and water discharges. The surface water depths, velocities and discharges may be computed for each pixel of the subfield geometry, and for each event, such as a rainstorm or other types of precipitation. The computed values may be used to generate infiltration profiles for the field and the events.

Infiltration profiles and events generated for an agricultural field may be used to improve predictions of hydrologic flux. The predictions may be used to generate notifications indicating the presence of standing surface water or surface water head at subfields of the field. Receiving the notifications may be useful to crop growers to identify the subfields susceptible to, for example, ponding water. Furthermore, the growers may use the notifications to determine the subfields in the field that are prone to accumulating water after strong rainfalls or storms.

Model predictions of hydrologic fluxes may be used to improve monitoring nitrogen levels in a field and to help determining accurate applications of nitrogen to the field to help to optimize crop yields expected from the field in the future. In an embodiment, the predictions may be provided to control computers of agricultural machines, such as a fertilizer spreader, dispatched in the field to adjust the nitrogen application instructions executed by the machines as the machines apply fertilizers to the field.

Model output predictions may be captured in a model output layer for an agricultural field, and the model output may be used by agricultural scripting tools as an independent variable, i.e., a covariant, to generate and modify agricultural prescriptions for agricultural practices for managing the field. For example, the model output predictions may be provided to a control computer of an irrigation system installed in the field; based on the provided predictions, the irrigation system may adjust its watering settings and the amounts of water sprayed over the field.

Model output predictions may be also provided to control computers of agricultural machines, such as planters, seeders, harvesters, combines and cultivators, to adjust the paths within the field that the machines will follow to plant seeds or harvest crops to avoid areas that, according to the provided predictions, are covered with standing water or mud. The predictions may be also used by the planters and seeders to adjust, based on the provided predictions, amounts of seeds to be planted by the seeders in the field, so that the areas with standing water receive a different application of seeds than the areas without standing water.

Model output predictions may be used by an intelligence computer system to generate agricultural prescriptions, status reports, summaries, and other documents. The predictions may be used to, for example, forecast and explain yield variability, and how the yield variability is impacted by the predicted changes in soil moisture conditions in the field. Furthermore, the predictions may be used to generate explanations for the yield variability between wet years and dry years. To generate the explanations, the intelligence computer system may use the predictions that include information about the subfield soil moisture levels for the field and information about boundaries of the watersheds formed in the field to explain why the crop yield from some subfields is low.

2. Example Agricultural Intelligence Computer System

2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorus, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, model and field data repository 160, and code instructions 180. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, code instructions 180 comprise slope and curvature modeling instructions 136, shallow water instructions 137, kinematic wave instructions 138, and overland flow modeling instructions 139. Additional code instructions may also be included. Slope and curvature modeling instructions 136 may be used to generate, based on high-resolution geometry data for a field, a digital model capturing the slopes and curvatures within the field. Shallow water instructions 137 may be used to calculate the shallow water equations using the slope and curvature model generated based on the high-resolution geometry for the field. Kinematic wave instructions 138 may be used to calculate the kinematic wave equations using the slope and curvature model generated based on the high-resolution geometry for the field. Overland flow modeling instructions 139 may be used to generate an overland flow model for the field.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
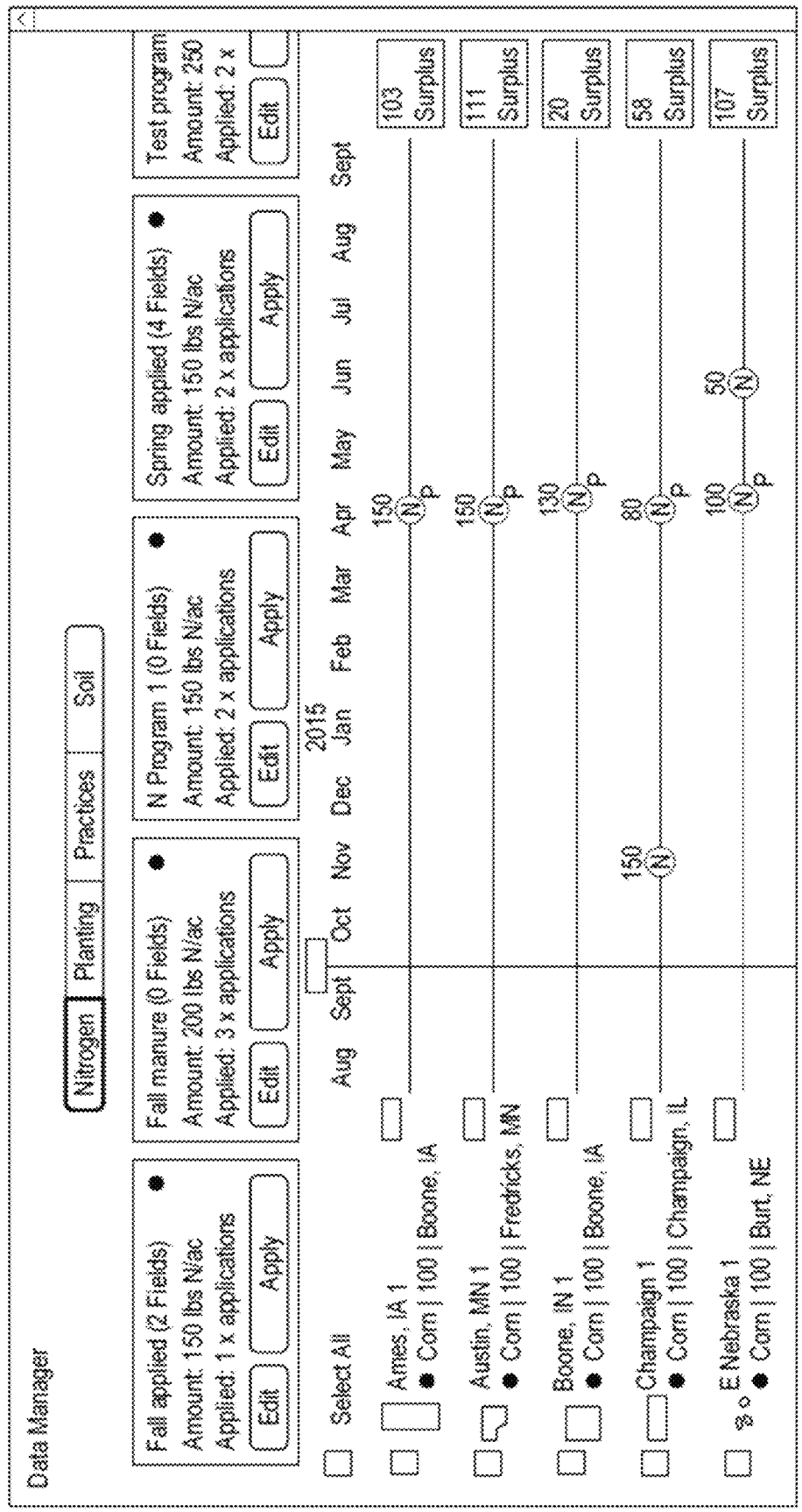
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab.

The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil management, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs. N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
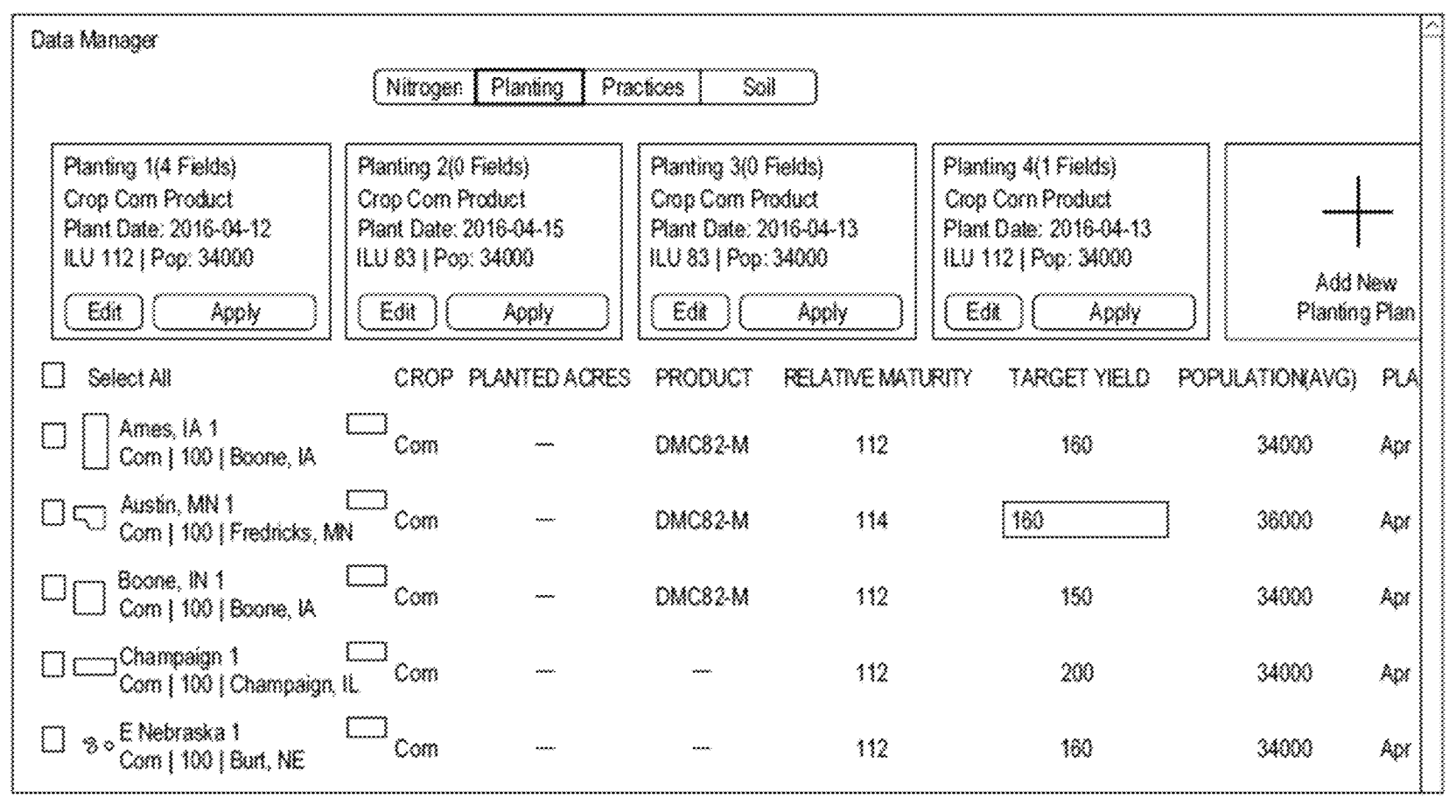

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
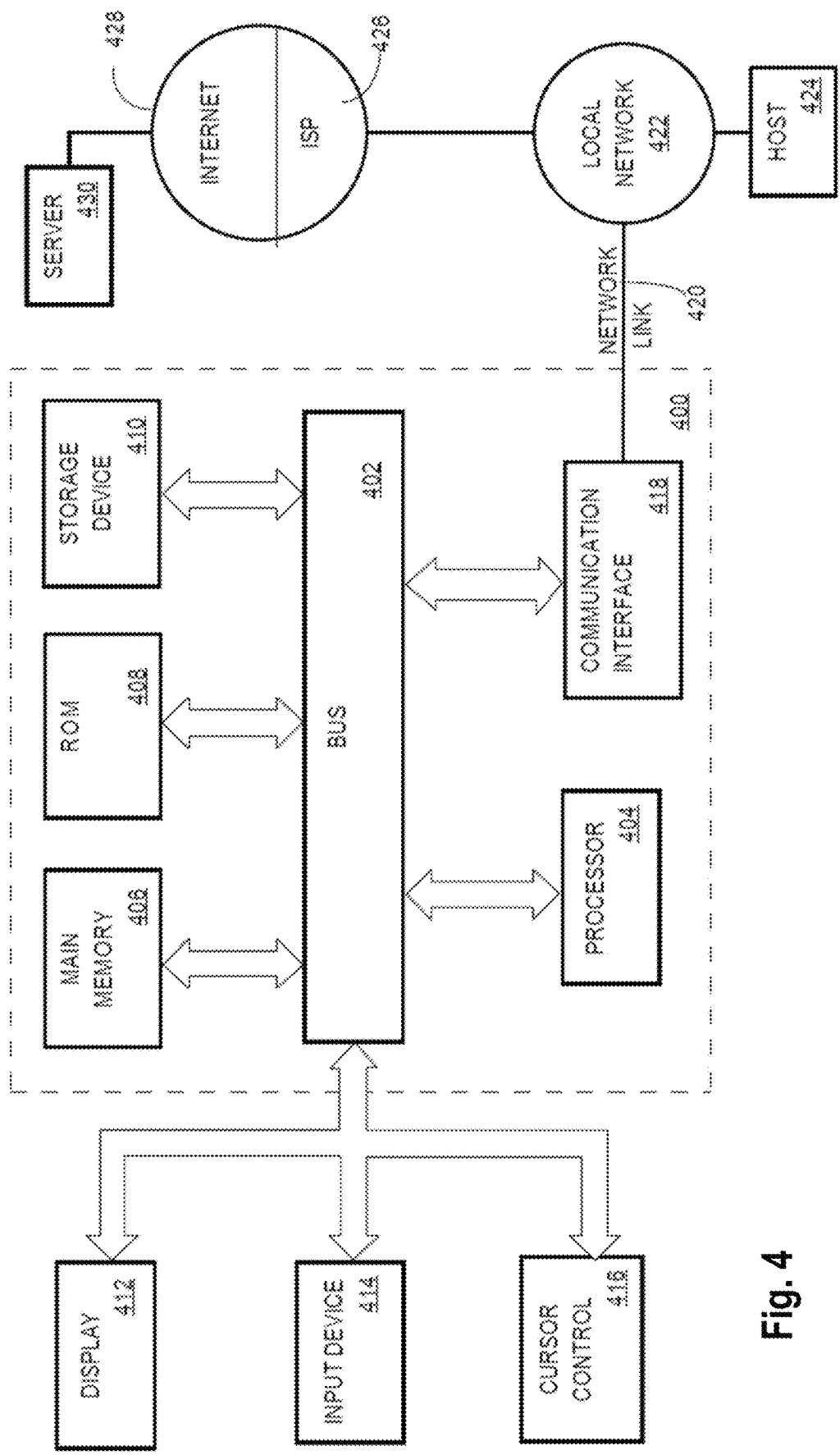
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more smartphones, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multi-lateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
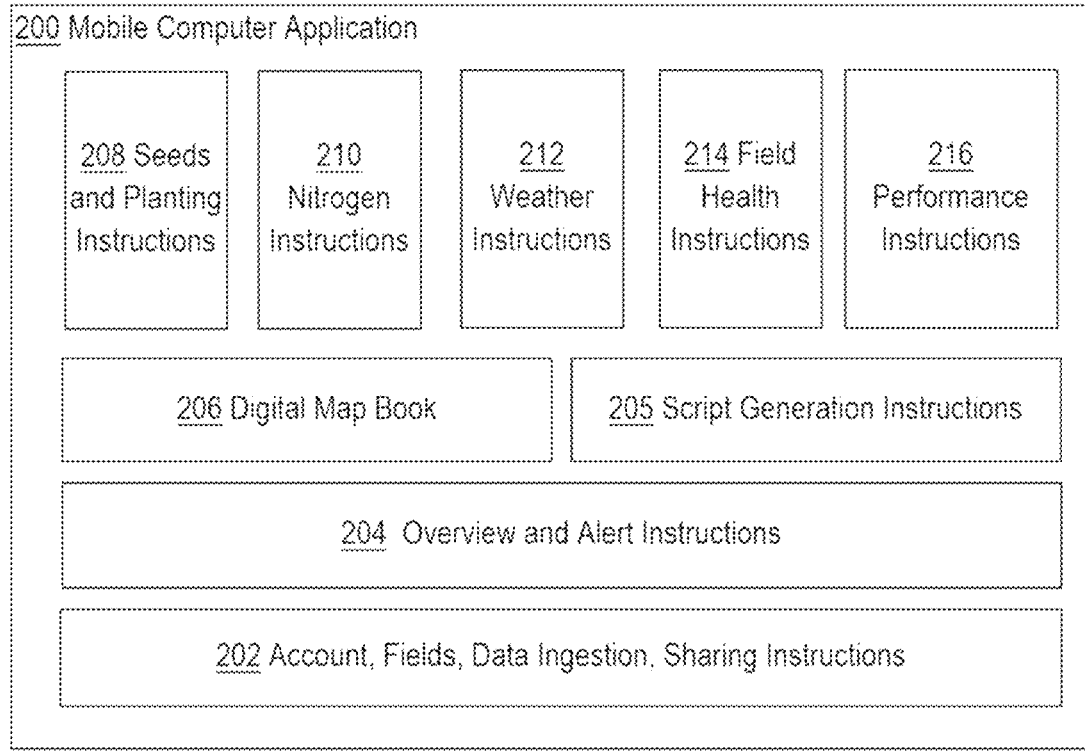
FIG. 2 illustrates two views of an example logical organization of sets of instructions in main memory when an example mobile application is loaded for execution.
Figure 2:
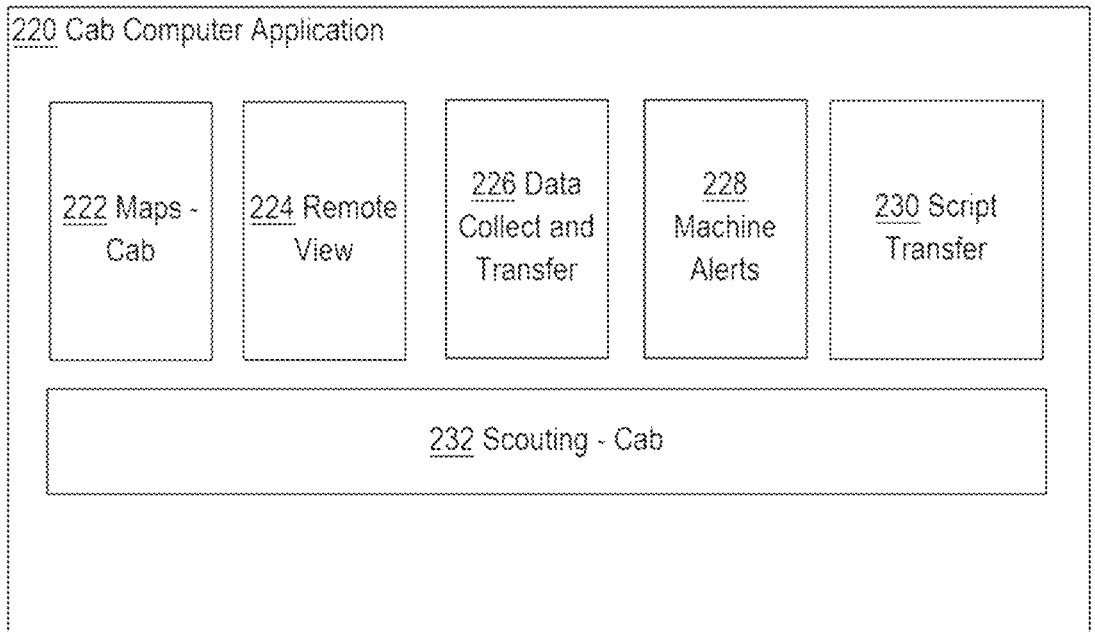

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shapefiles, native data formats of third parties, and/or farm management information system (FMIS) exports, among others. Receiving data may occur via manual upload, email with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No.

62/220,852, filed on Sep. 18, 2015, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
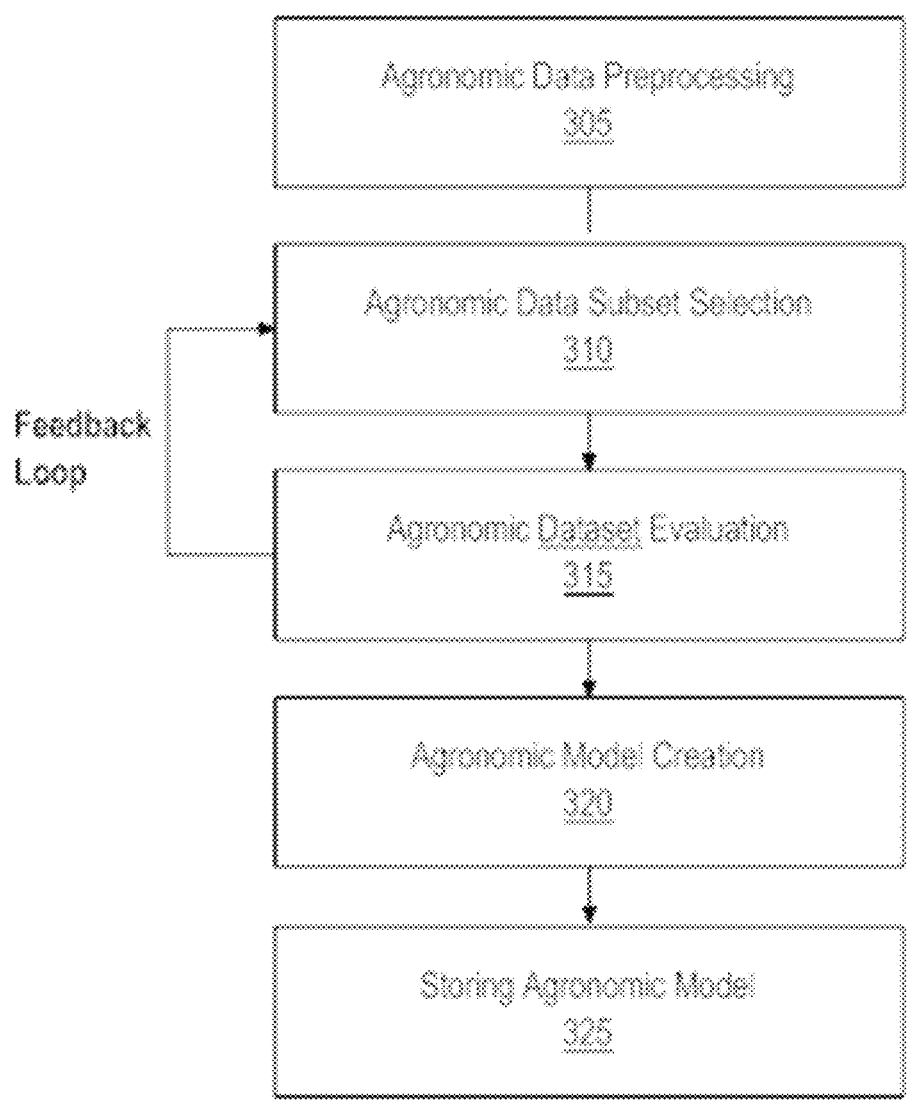
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset-models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop, where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated-services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Improved Subfield Moisture Modeling Techniques

Nitrogen levels in soil of an agricultural field may be impacted by water accumulated in the field due to subfield overland flows and presence of shallow water tables. The overland flows often provide same-day redistributions of fluxes across the field, while redistribution of the shallow water tables may often take several days. Because of the temporal differences in the water redistributions, both the overland flow redistribution and the sub-surface flow redistribution need to be modelled accurately to obtain the models that can be useful to the crop growers.

Figure 7:
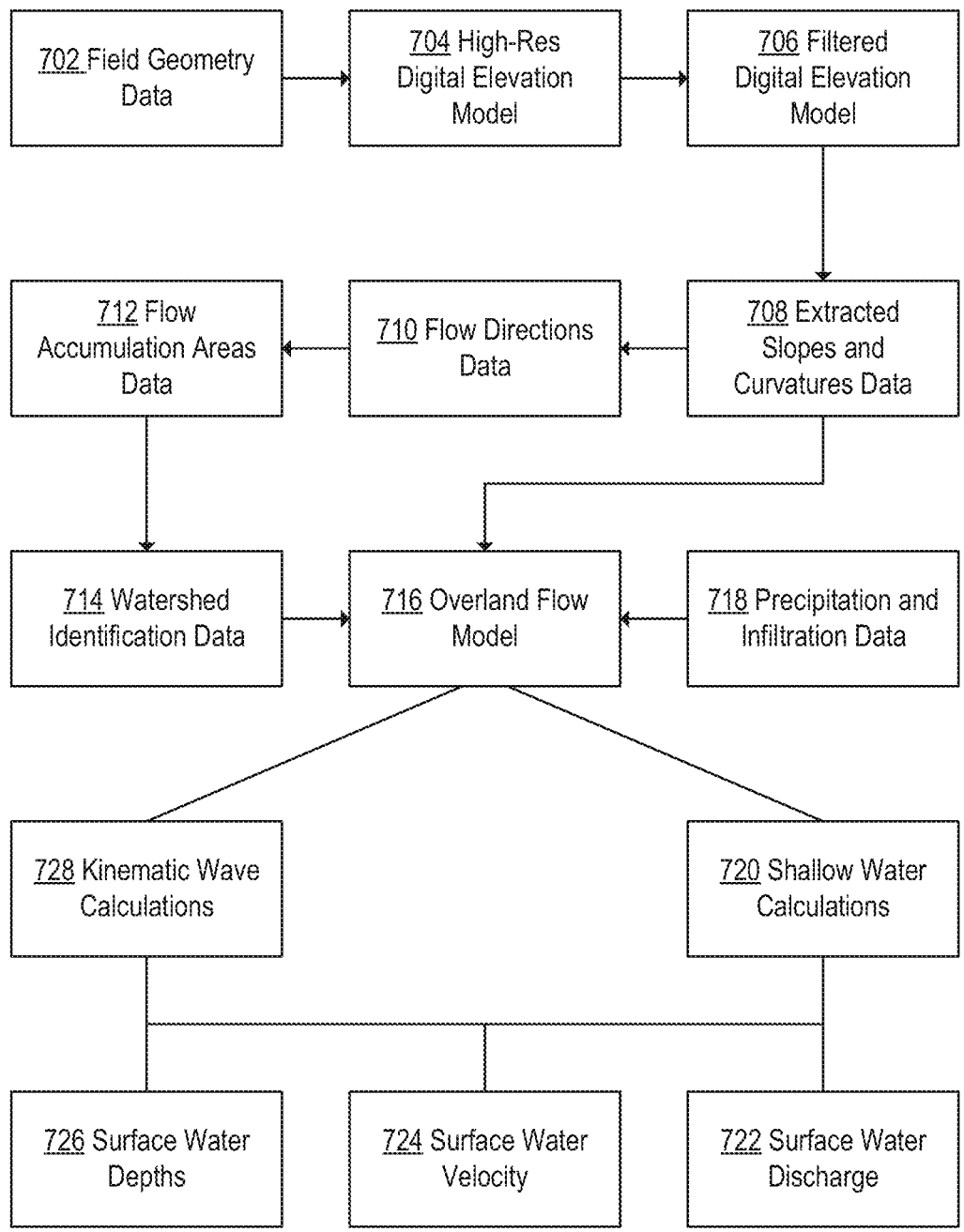
FIG. 7 depicts an example workflow for determining an overland flow model for an agricultural field.
Figure 8A:
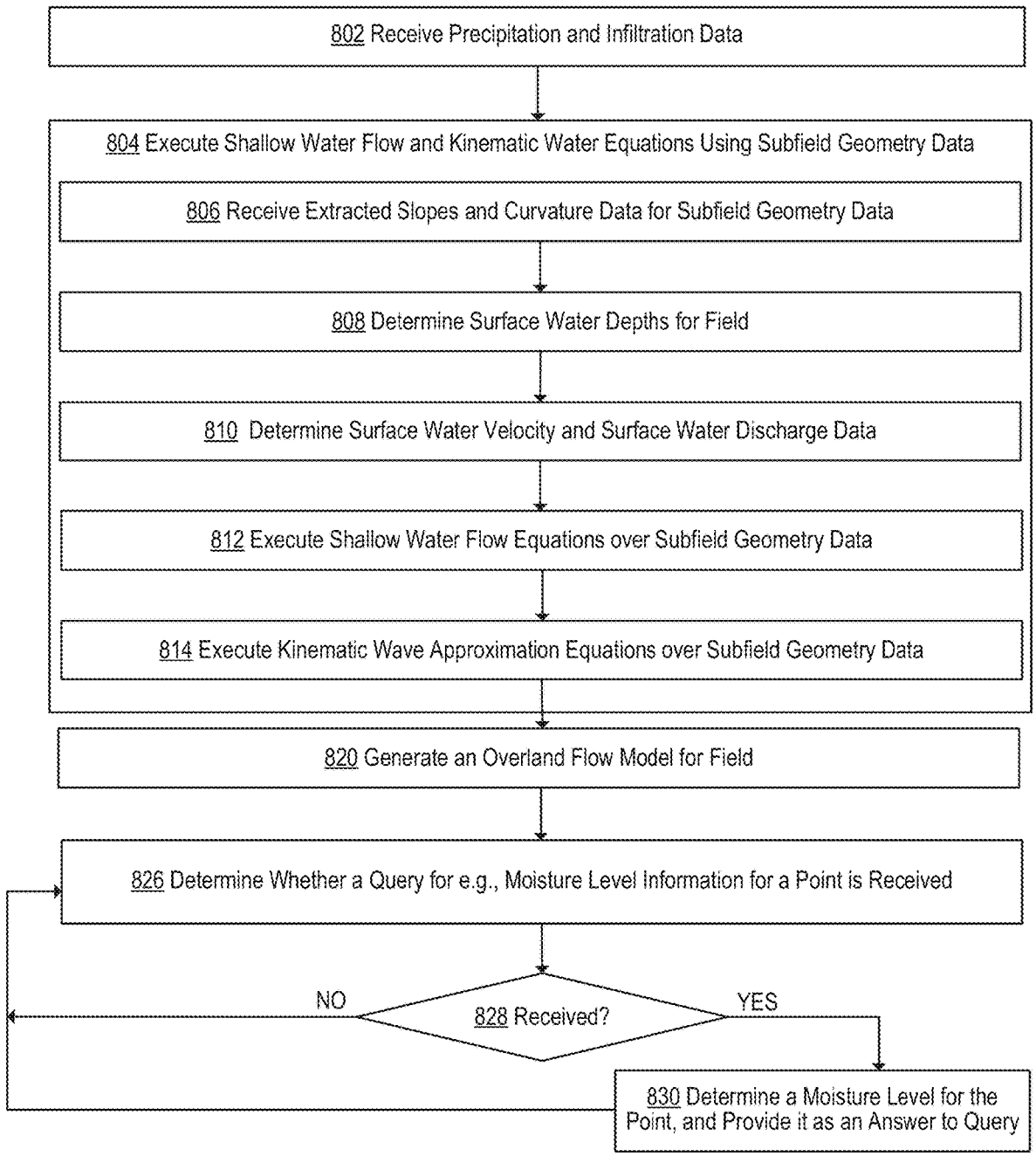
FIG. 8A depicts an example flowchart for determining an overland flow model for an agricultural field using finite volume approaches.
Figure 8B:
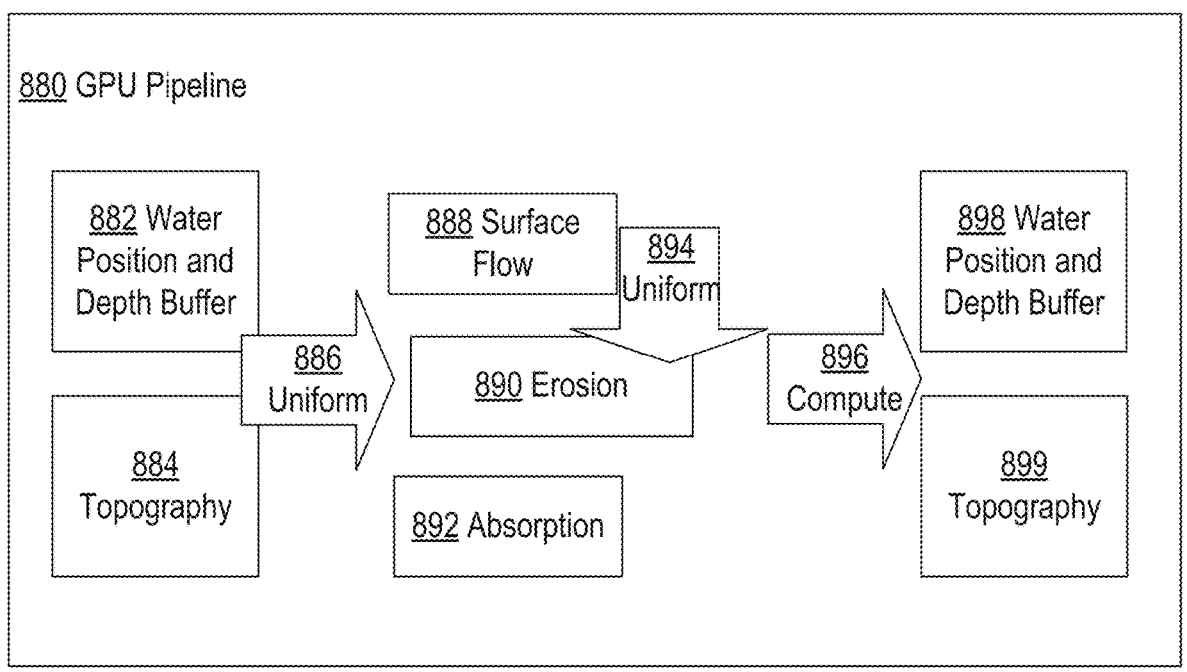
FIG. 8B depicts an example approach for solving shallow water equations using a multi-core graphics processing unit.
Figure 8C:
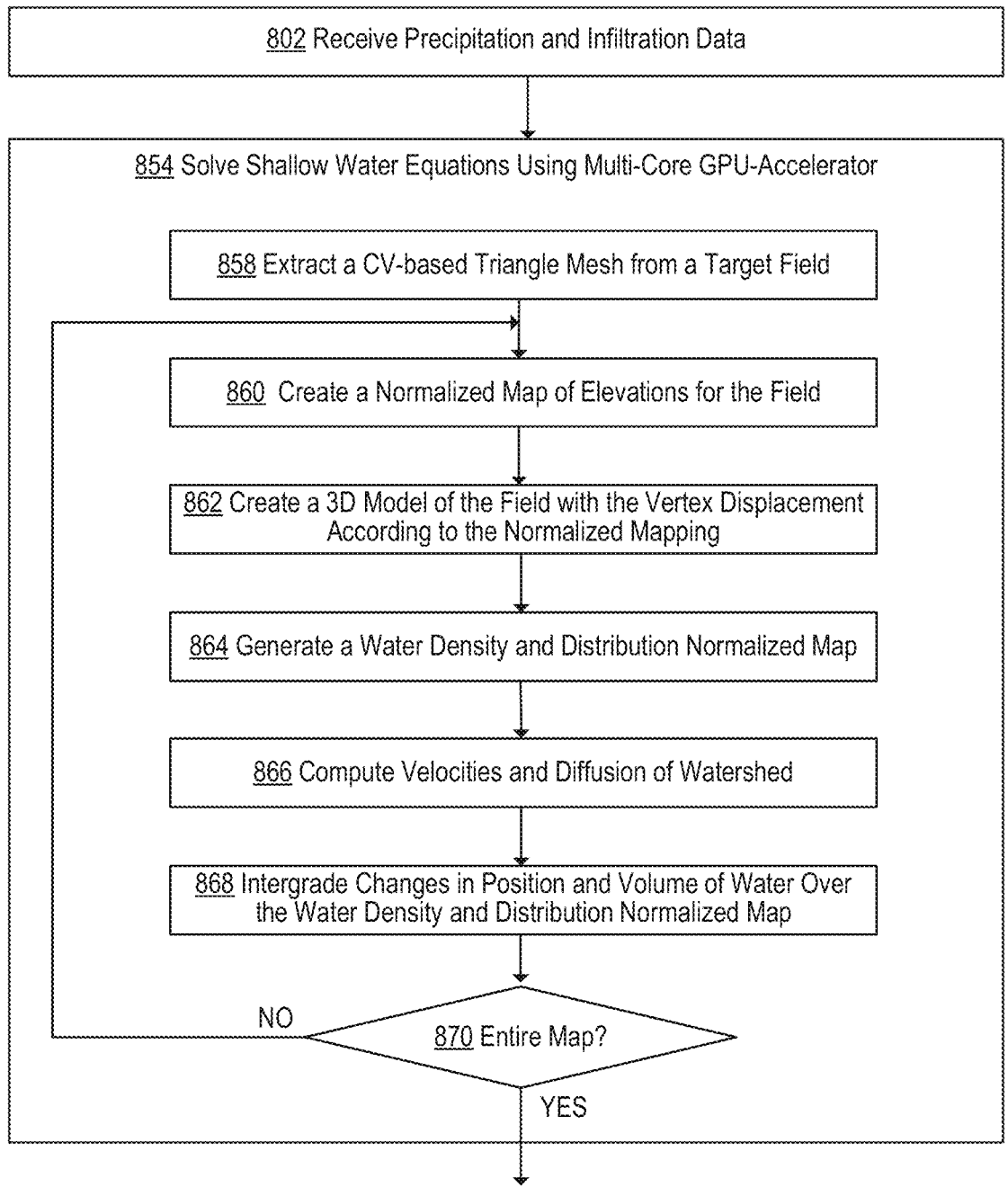
FIG. 8C depicts an example flowchart for solving shallow water equations for an agricultural field using a multi-core graphics processing approach.
Figure 9:
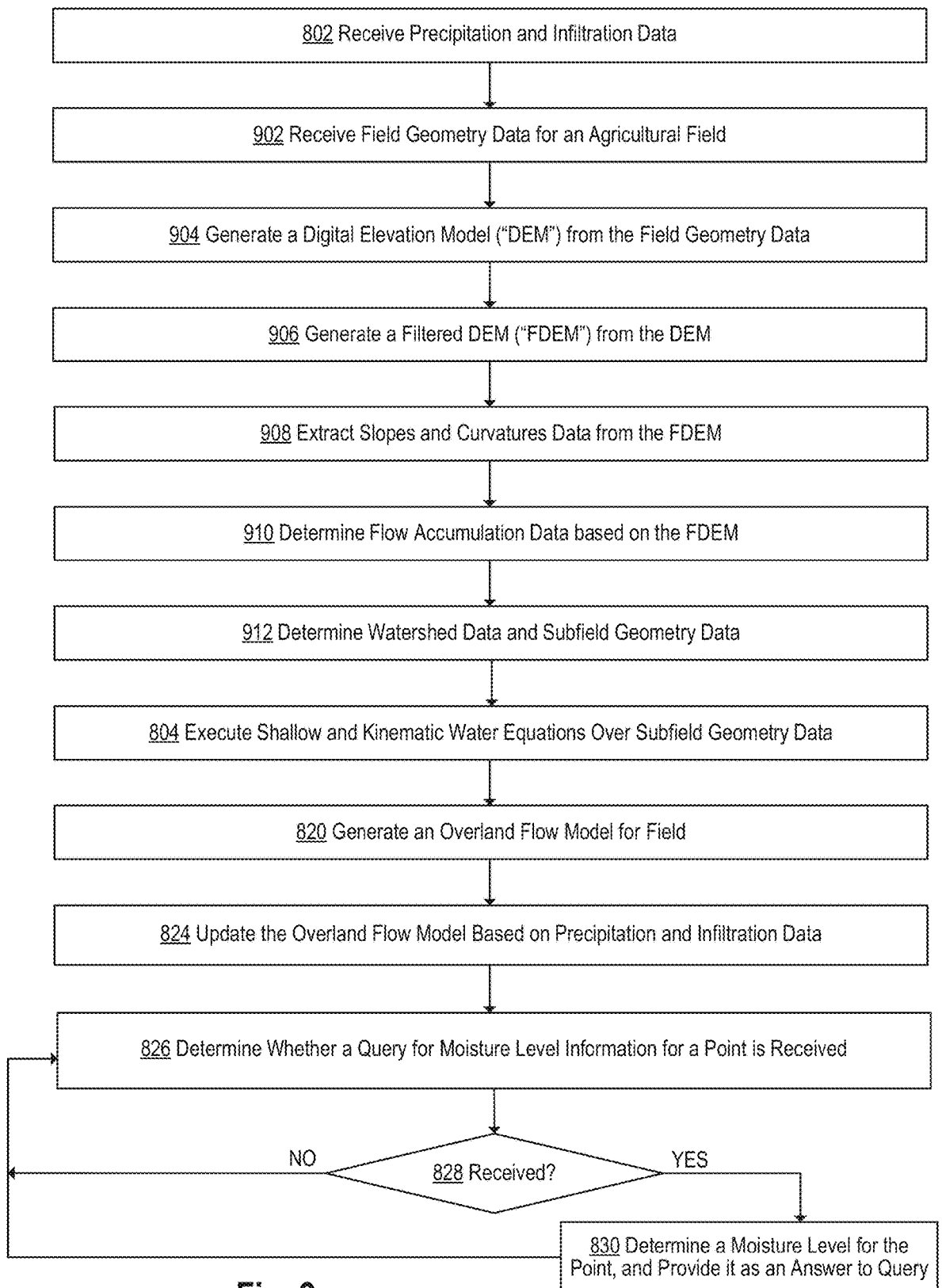
FIG. 9 depicts an example flowchart for determining an overland flow model for an agricultural field.
Figure 10:
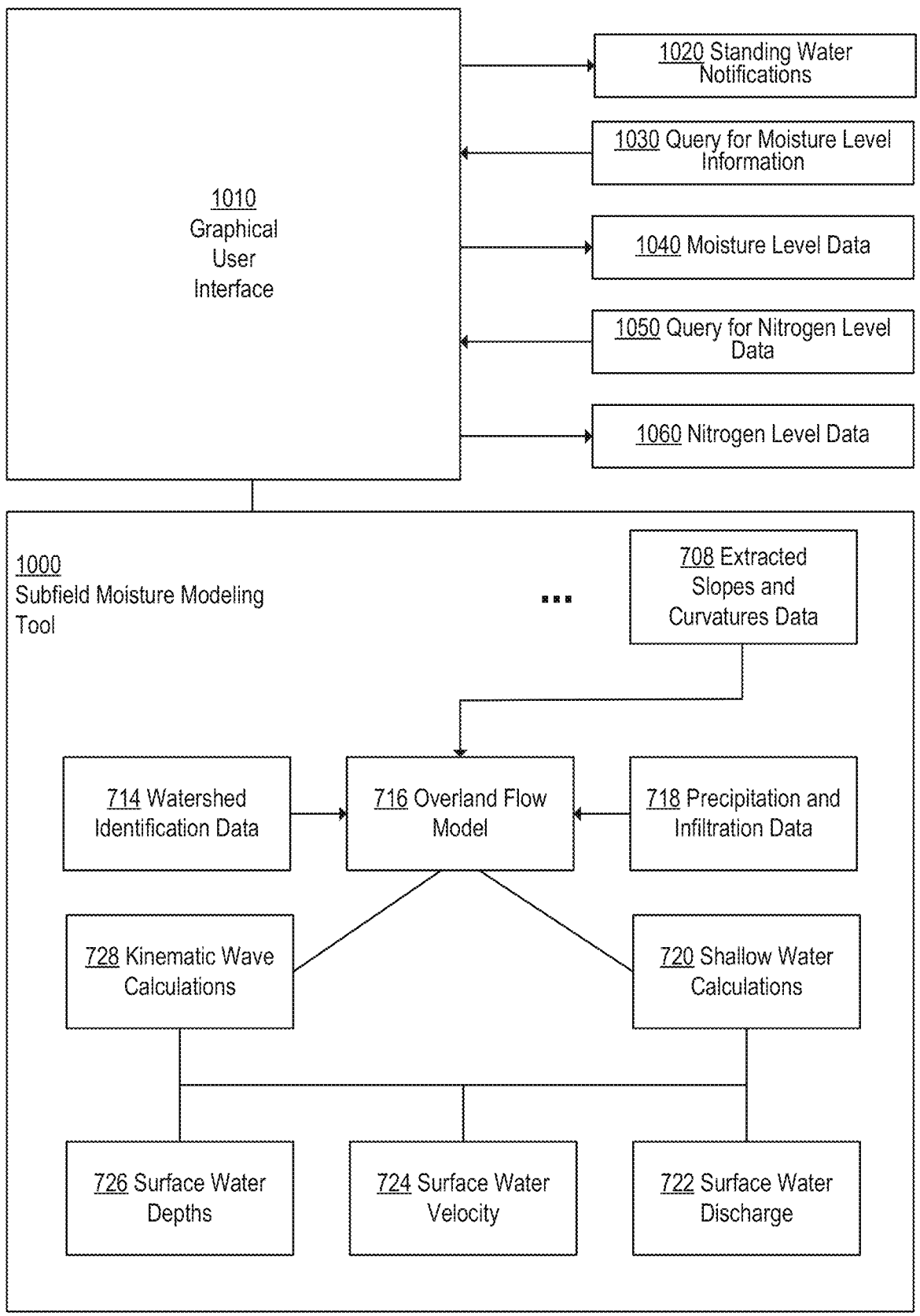
FIG. 10 is a block diagram that illustrates an example computer system configured to generate and display graphical user interface configured to interact with a subfield moisture modeling tool.

FIG. 7 depicts an example workflow for determining an overland flow model for an agricultural field. FIG. 8A depicts an example flowchart for determining an overland flow model for an agricultural field. FIG. 8B depicts an example approach for solving shallow water equations using a graphics processing unit. FIG. 8C depicts an example flowchart for determining an overland flow model for an agricultural field using a multi-core graphics processing approach. FIG. 9 depicts an example flowchart for determining an overland flow model for an agricultural field. FIG. 10 is a block diagram that illustrates an example computer system configured to generate and display graphical user interface configured to interact with a subfield moisture modeling tool. In an embodiment, the functions that are described herein in relation to FIG. 7, FIG. 8A, FIG. 8B, FIG. 8C, FIG. 9, and FIG. 10 may be implemented using code instructions 180, described in FIG. 1.

FIG. 7 depicts an example workflow for determining an overland flow model for an agricultural field. The example workflow may start with obtaining high-resolution geometry data 702 for the field. High-resolution geometry data 702 may be used to generate a high-resolution digital elevation model ("DEM") 704 for the field. High-resolution DEM 704 may have a fine-grid pixel resolution. For example, it may be based on a 5 m by 5 m pixel grid.

High-resolution DEM 704 may be used to generate a high-resolution, filtered digital elevation model ("FDEM") 706. The filtering may include applying nonlinear anisotropic filtering techniques to remove so called noise data or outliers, and to smooth the data points of high-resolution DEM 704. The nonlinear anisotropic filtering techniques may include finite difference and finite volume numerical methods to perform filtering of the data points in the high-resolution DEM 704.

Based on high-resolution, FDEM 706, slopes and curvature data 708 for the field is determined. A slope, in this context, is an elevated geological formation. For example, a slope may be a stretch of ground forming a natural or artificial incline in the field. A curvature, in this context, is a characteristic or a measure of a slope.

Based on extracted slopes and curvature data 708 and based on soil data, precipitation data and infiltration data 718 for the field, and a water flow accumulation model 716 is generated. In an embodiment, water flow accumulation model 716 corresponds to an overland flow model. Model 716 may be generated using a D-infinity approach, and on a pixel-basis.

Based on extracted slopes and curvatures data 708, flow direction data 710 for the data is determined.

Based on flow directions data 710, flow accumulation areas data 712 is determined. That data captures the information about standing waters.

Based on flow accumulation areas data 712, watershed boundaries and water outlets 714 caused by the precipitation received in the field are determined.

Based on watershed boundaries and water outlets 714, overland flow model 716 may be refined by adding the watershed boundaries component and the water outlets component to overland flow model 716. At this point, overland flow model 716 captures information about the same-day redistributions of fluxes of water across the field and captures information about the watershed identification data.

The information about the watershed identification data and the overland flow model 716 may be used to execute shallow water calculations 720 for the watersheds and the model. Executing shallow water calculations 720 may include solving one or more shallow water flow equations with respect to the pixel-based overland flow model. This may also include modeling covariates, such as a surface water depth parameter, a surface water velocity parameter, and a surface water discharge layer parameter as a function of space and time for the observed weather conditions. Once execution of shallow water calculations 720 is completed, the results may be used to update overland flow model 716, which in turn may be used to generate a subfield soil moisture model.

The information about the watershed identification data and overland flow model 716 may be used to execute kinematic wave calculations 728. Executing kinematic wave calculations 728 may include solving one or more kinematic wave equations with respect to the pixel-based overland flow model. It may also include modeling covariates, such as a surface water depth parameter, a surface water velocity parameter, and a surface water discharge layer parameter as a function of space and time for the observed weather conditions. Once execution of kinematic wave calculations 728 is completed, the results may be used to update overland flow model 716, which in turn may be used to regenerate the subfield soil moisture model.

The subfield soil moisture model may be used to generate answers to queries for moisture levels for certain points of the field. The query and answer functionalities may be provided via a graphical user interface. Using the query functionalities, a user may enter, for example, a query for moisture level information for a certain point of interest in the field. In response to the query, the subfield soil moisture model is accessed, the soil moisture level information for the certain point from the model is extracted, and the extracted soil moisture level information is displayed as a response to the query.

The subfield soil moisture model may be also used to provide answers to queries for nitrogen levels for certain points of the field. The query functionalities may be provided via a graphical user interface, such as the interface described above. Using the query functionalities, a user may enter, for example, a query for nitrogen level information for a certain point of interest in the field. In response to the query, the system may access the subfield soil moisture model, extract the soil moisture level information for the certain point from the model, use the extracted soil moisture level information to determine a nitrogen level for the certain point, and display the determined nitrogen level information as a response to the query.

3.1. Overland Flow Models for Agricultural Fields

FIG. 8A depicts an example flowchart for determining an overland flow model for an agricultural field. The process depicted in FIG. 8A captures the processing described in blocks 714-726 of FIG. 7. The process may be executed by an agricultural intelligence computer system 130 described in FIG. 1. To perform the process depicted in FIG. 8A, an agricultural intelligence computer system 130 may execute code instructions 180, such as slopes and curvature modeling instructions 136, shallow water instructions 137, kinematic wave instructions 138, and overland flow modeling instructions 139. For the clarity of the description, agricultural intelligence computer system 130 is referred to as an AIC system, or a system.

In step 802, an AIC system receives precipitation and water infiltration data for an agricultural field. This step corresponds to determining precipitation and infiltration data 718, described in FIG. 7.

The received data may indicate the amounts of precipitation recorded for the field and may be represented as a mapping between a pixel-based geometry map of the field and the corresponding precipitation data. The received data may also include the water infiltration data that indicates a measure of the infiltration rate at which the soil is able to absorb rainfall or irrigation water. The infiltration data may be represented, for example, as a mapping between pixels of the pixel-based geometry map of the field and the corresponding infiltration rates.

In step 804, the AIC system executes shallow water flow equations and kinematic wave equations over subfield geometry data. As depicted in FIG. 8A, this step may include several sub-steps, such as sub-steps 806-814.

In step 806, the AIC system receives extracted slopes and curvature data for subfield geometry data for the field. This sub-step corresponds to receiving extracted slopes and curvatures data 708, described in FIG. 7.

In step 808, the AIC system determines surface water depths for the field. This step corresponds to determining surface water depth 726, described in FIG. 7. A surface water depth for a particular area covered with water may be measured in inches, centimeters, and the like. It indicates the depth of the standing water detected in the particular area.

In step 810, the AIC system determines surface water velocity data and surface water discharge data. This step corresponds to determining surface water velocity data 724 and surface water discharge data 722, described in FIG. 7. The data may be provided to the AIC system in a form of data tables containing empirically determined information.

In step 812, the AIC system executes one or more shallow water flow equations over the subfield geometry data. This step corresponds to executing shallow water calculations 720, described in FIG. 7.

In an embodiment, the shallow water equations are derived from a depth-averaged integration of the Navier-Stokes equations. More specifically, the shallow water flow equations are simplifications of the Navier-Stokes equations to make the equations appropriate for modeling an open-channel water flow for an entire watershed. That means that the horizontal length scale in the equations is much greater than the vertical scale. It is assumed herein that the fluid is incompressible. The shallow water equations may be expressed in terms of conservation of the mass and momentum.

In one dimension, the conservation of mass equation can be written as:

$$\frac{\partial h}{\partial t} + \frac{\partial uh}{\partial x} = P - I \qquad (1)$$

which is equivalent to:

$$\frac{\partial h}{\partial t} + \frac{\partial q}{\partial x} = P - I \qquad (2)$$

where h is the flow depth (L), t is the time (T), u is the depth-averaged velocity in the x direction (L/T), q is the flux density in the x direction (L²/T), x is the longitudinal distance (L), P is the incoming precipitation (L/T), and I is the infiltration (L/T).

The one-dimensional conservation of momentum equation can be written as:

$$\frac{\partial u}{\partial t} + u\frac{\partial u}{\partial x} + g\frac{\partial h}{\partial x} + g(S_{0x} + S_{fx}) = 0 \qquad (3)$$

where g is the acceleration due to gravity (L²/T), $S_{fx}$ is the energy slope in the x direction, and Sox is the ground slope in the x direction.

The first three terms in equation (3), comprising local acceleration, convective acceleration, and pressure force, are negligible in comparison to the last two terms representing gravitational and friction forces. Therefore, equation (3) may be simplified by, for example, setting negligible forces to zero. This simplification leads to the kinematic wave approximation.

In step 814, the AIC system executes one or more kinematic wave approximation equations over the subfield geometry data. This step corresponds to executing kinematic wave calculations 728, described in FIG. 7. To determine kinematic wave approximations, it is assumed that the energy slope and the ground slope are equal. The assumption that the energy slope and the ground slope are equal is reasonable especially for a steep topography. Therefore, such approximations can be successfully applied to, for example, mountain-based watersheds.

Solving a kinematic wave equation amounts to solving a modified equation (1), in which a flow can be expressed as a function of depth by using the Manning equations:

$$Q = A \cdot V, \qquad (4)$$

$$Q = A \cdot \frac{h^{2/3} \cdot \sqrt{S}}{n_{eff}} \qquad (5)$$

The relations expressed in equations (4)-(5) may be used to express q values as a function of u and h.

In an embodiment, it is assumed that the kinematic wave equation is solved over a 2D grid of geometry data for the field. The kinematic wave equation based on equation (1) in a 2D domain may be expressed as:

$$\frac{\partial h}{\partial t} + \frac{\partial q_x}{\partial x} + \frac{\partial q_y}{\partial y} = P - I \qquad (6)$$

Kinematic wave equations expressed in a 2D domain, such as equation (6), may be solved using many different approaches. One of the approaches uses a first order explicit scheme. Another approach is based on a finite volume method. Other approach utilizes hardware capabilities of a multiple-core graphics processing unit ("GPU"). These approaches are described below. However, equation (6) may be also solved using other approaches.

3.1.1. First Order Explicit Methods for Solving Wave Equations

Equation (6) may be solved using a first order explicit scheme for time and a second order central differencing scheme in space. Therefore, equation (6) may be rewritten as:

$$\frac{h_{(i,j)}^{t+1} - h_{(i,j)}^t}{\Delta t} + \frac{q_{x(i+1,j)}^t - q_{x(i-1,j)}^t}{2\Delta x} + \frac{q_{y(i+1,j)}^t - q_{y(i-1,j)}^t}{2\Delta y} = P - I \qquad (7)$$

where $\Delta t$ is the time step of calculation; $\Delta x$ and $\Delta y$ are the lengths of the calculation grid unit in the x direction and the y direction, respectively.

The water flux (q) in the x and y directions may be expressed using the Manning equation:

$$q_x = \frac{h^{2/3} S_{0x}^{1/2}}{n_{\textit{eff}}}, \quad (8)$$

$$q_y = \frac{h^{2/3} S_{0y}^{1/2}}{n_{\textit{eff}}} \quad (9)$$

3.1.2. Finite Volume Methods for Solving Wave Equations

In an embodiment, the AIC system is programmed with instructions to solve kinematic wave equations expressed in a 2D domain, such as equation (6), using a finite volume approach. Using programming for the finite volume approach, the AIC system is programmed to solve the 2D kinematic wave equation (6) by selecting a calculation point at the center of the grid:

$$\frac{h_{(i,j)}^{t+1} - h_{(i,j)}^{t}}{\Delta t} = -\frac{q_{x(i+1/2,j)}^{t} \cdot \Delta y_{i+1/2,j} + q_{x(i-1/2,j)}^{t} \cdot \Delta y_{i-1/2,j}}{\Delta \bar{x} \cdot \Delta \bar{y}} - \frac{q_{y(i,j+1/2)}^{t} \cdot \Delta x_{i,j+1/2} + q_{y(i,j-1/2)}^{t} \cdot \Delta x_{i,j-1/2}}{\Delta \bar{x} \cdot \Delta \bar{y}} + P - I \quad (10)$$

wherein $\Delta t$ is the time step of calculation; $\Delta x$ and $\Delta y$ are the lengths of the calculation grid unit in the x and y direction, respectively; and $\Delta x$ and $\Delta y$ with the subscripts are the real lengths of the cell in the x and y directions, respectively.

Since every element may have more than a single inflow cell or more than a single outflow cell, applying a first order backward difference operator to equation (1) allows rewriting the unit inflow discharge getting into a cell during $\Delta t$ in the x direction as:

$$q_{x(i-1/2,j)}^{t} \cdot \Delta y_{i-1/2,j} = [\max(q_{x(i-1,j)}, 0) \Delta y_{i-1/2,j}] - [\min(q_{x(i+1,j)}, 0) \Delta y_{i+1/2,j}] \quad (11)$$

$$q_{y(i,j-1/2)}^{t} \cdot \Delta x_{i,j-1/2} = [\max(q_{y(i,j-1)}, 0) \Delta x_{i,j-1/2}] - [\min(q_{y(i,j+1)}, 0) \Delta x_{i,j+1/2}] \quad (12)$$

where $\Delta x_{i,j-1/2}$, $\Delta y_{i-1/2,j}$, $\Delta x_{i,j+1/2}$ and $\Delta y_{i+1/2,j}$ are the actual lengths of four sides of a cell, respectively. Similarly, during $\Delta t$, the outflow discharge components in the x and y directions can be expressed in programmed instructions as:

$$q_{x(i+1/2,j)}^{t} \cdot \Delta y_{i+1/2,j} = q_{x(i,j)} \cdot \begin{bmatrix} \Delta y_{i+1/2,j} & q_{x(i,j)>0} \\ \Delta y_{i-1/2,j} & q_{x(i,j)<0} \end{bmatrix} \quad (13)$$

$$q_{y(i,j+1/2)}^{t} \cdot \Delta x_{i,j+1/2} = q_{y(i,j)} \cdot \begin{bmatrix} \Delta x_{i,j+1/2} & q_{y(i,j)>0} \\ \Delta x_{i,j-1/2} & q_{y(i,j)<0} \end{bmatrix} \quad (14)$$

where $\Delta x_{i,j-1/2}$, $\Delta y_{i-1/2,j}$, $\Delta x_{i,j+1/2}$ and $\Delta y_{i+1/2,j}$ represent the side lengths of an upstream cell in the x and y directions, respectively; and $\Delta x_{i,j+1/2}$, $\Delta y_{i+1/2,j}$ represent the side lengths of a downstream cell in the x and y directions, respectively.

3.1.3. GPU-Based Methods for Solving Wave Equations

In an embodiment, the AIC system is programmed to execute instructions to solve kinematic wave equations expressed in a 2D domain, such as equation (6), by utilizing hardware capabilities of a multiple-core graphics processing unit ("GPU"). Explicit finite volume methods typically rely on stencil computations, and the computations employed by the explicit finite volume methods are inherently parallel. In an embodiment, the computations are performed by a many-core graphics processing unit ("GPU").

A stencil computation consists of an iterated assignment to elements of an array by an expression that involves arrays indexed by some function of the indices used to assign to the target.

In an embodiment, an efficient hardware-adapted shallow water simulation is executed by a GPU. The simulation is based on a high-resolution central-upwind scheme implemented in programmed instructions. The approach presented herein may be extended to other architectures that are similar to the GPU-based architecture and/or other hyperbolic-conservation-laws-based architectures.

FIG. 8B depicts an example approach for solving shallow water equations using a multi-core graphics processing unit. In the depicted example, a GPU pipeline includes the processing that is performed by a multi-core GPU and that results in computing water position and depth data, which in turn is provided to the CPU.

In an embodiment, a GPU of a GPU pipeline 880, receives, in a buffer 882, water position and depth data. The GPU also receives, in a buffer 884, field topography data. The water position and depth data, stored in buffer 882, and the topography data, stored in buffer 884, is uniformed by the GPU, as shown in a process arrow 886. A uniform is a global Shader variable declared with the "uniform" storage qualifier. They act as parameters that the user of a shader program can pass to the program. Their values are stored in a program object. Uniforms are so named because they do not change from one shader invocation to the next within a particular rendering call. This makes them unlike shader stage inputs and outputs, which are often different for each invocation of a shader stage.

In an embodiment, surface flow data 888, erosion data 890 and absorption data 892, is uniformed by the GPU, as shown in a process arrow 894.

In an embodiment, the uniformed output generated by process 886 and the uniformed output generated by process 894 are combined and used to compute, as shown in a process arrow 896, new water position and depth data and new topography data. The new water position and depth data is stored in buffer 898, while the new topography data is stored in a buffer 899.

Once the water position and depth buffers are computed inside the GPU, the resulting data, stored in buffers 898 and 899, are passed onto the CPU and merged with data computed as previously. More specifically, the data computed in the previous timestep is merged with the current timestep computation returned from the GPU.

FIG. 8C depicts an example flowchart for solving shallow water equations for an agricultural field using a multi-core graphics processing approach.

In step 854, shallow water equations for determining a subfield moisture model for a field are solved using a GPU-bases accelerator. To port the shallow water equations to the GPU-based accelerator, a 3D mesh representing the field is produced and ported to the GPU. An example process is described in steps 858-868 of FIG. 8C.

In step 858, a CV-based triangular mesh is extracted from a target field. The 3D mesh may be produced based on existing field data and computer vision ("CV") data that can be used to perform the watershed computations. The CV data may be acquired, or otherwise obtained, by extracting high-dimensional data from the images depicting the field in order to produce a numerical representation of the field. This may include transformation of the images into 3D meshed geometry.

In step 860, a normalized map of elevations is generated for the field.

In step 862, a 3D model of the field is created. The 3D model may include the vertex displacement normals mapped onto the vertices.

In step 864, a water density and distribution normalized map is generated based on, at least in part, the 3D model of the field.

In step 866 water velocities and diffusion for the watershed are computed based on the water density and distribution normalized map and the 3D model.

In step 868, the changes in position and volume over the density distributions are determined. The changes are normalized, and then integrated with other changes over the density distributions.

If, in step 870, it is determined that the equations have been solved for the entire map, then step 820, shown in FIG. 8A, is executed. Otherwise, the steps 860-868 are repeated until the shallow equations for the entire map are computed.

3.1.4. Generating an Overland Flow Model for a Field

Referring again to FIG. 8A, in step 820, the AIC system generates an overland flow model for the field based on the results obtained by executing the shallow water equations and the kinematic wave approximation equations. This step corresponds to generating overland flow model 716, described in FIG. 7.

The time step for the model may be calculated using the expression:

$$\delta t = \frac{N_{co} \delta x}{\sqrt{u^2 + v^2}} \quad (15)$$

where $N_{co}$ is a user-specified value for the Courant number. The typically used $N_{co}$ values are 0.2 so that the value of $\delta t$ higher than 0.3 seconds is not exceeded.

Steps 826-830 provide an example application of using the overland flow model for the field. The example application allows querying the system for a moisture level or a nitrogen level for a particular point in the field and generating an answer to the query based on the data stored in the overland flow model.

In step 826, the AIC system determines whether a query is received. Examples of queries include a query for a moisture level for a particular point in the field, a query for a nitrogen level for a particular point, and so forth. The query may be provided to the AIC system via a graphical user interface that is configured to provide interactivity with the AIC system and the data models generated by the AIC system.

If, in step 828, the AIC system determines that the query was received, then the AIC system proceeds to performing step 830; otherwise, the AIC system proceeds to performing step 826, in which the AIC system awaits receiving a query.

In step 830, the AIC system generates an answer to the query and provides the answer to the graphical user interface for displaying the answer on a display device. Generating an answer to the query may include querying the overland flow model for the moisture level information or the nitrogen level information for the particular point in the field. The answer may be expressed in a form of a data point, in a form of a 2D map for the area that includes the particular data point, in a form of a table, and the like.

3.2. Precipitation and Infiltration Data

In an embodiment, implementations of the process for generating an overland water flow model for an entire field assume that precipitation is spatially uniform over the field. This is a reasonable assumption for the fields that are rather small in size.

In an embodiment, a field centroid is identified, and hourly rainfall data provided for the field centroid is used to model infiltration and runoff rates for the field.

In an embodiment, infiltration is modeled using the Green and Ampt equation. The Green and Ampt model is based on water flux and assumes that the infiltration is proportional to the total head gradient. The Green-Ampt equation for infiltration capacity $I_c$ can be written as:

$$I_c = K_s \left(1 + \frac{(h + \psi_f)(\phi - \theta_i)}{F}\right) \quad (16)$$

where $I_c$ is the infiltration capacity (L/T), $K_s$ is the saturated hydraulic conductivity (L/T), $\psi_f$ is the capillary pressure head at the wetting front (L), F is the total infiltrated depth (L), $\varphi$ is the total porosity, h is the water depth (L), and $\theta_i$ is the initial soil moisture content.

Further, it is assumed that the soil properties are spatially uniform within a pixel domain. The initial soil moisture content may be modeled using, for example, the Darcy-Buckingham model.

3.3. Topography Processing

FIG. 9 depicts an example flowchart for determining an overland flow model for an agricultural field. The process may be executed by AIC system 130 described in FIG. 1. To perform the process depicted in FIG. 9, AIC system 130 may execute code instructions 180, such as slopes and curvature modeling instructions 136, shallow water instructions 137, kinematic wave instructions 138, and overland flow modeling instructions 139.

In step 802, an AIC system receives precipitation and infiltration data for an agricultural field. Step 802 is described in FIG. 8A.

In step 902, the AIC system receives field geometry data for the field. The field geometry data is usually a high-granularity topographical map of the field, such as per-subfield map, or a fine grid of 5 m by 5 m cells.

In step 904, the AIC system generates a digital elevation model from the field geometry data. This may include rasterization of the field geometry data and saving the digital mesh of data points in the digital elevation model.

In step 906, the AIC generates a filtered digital elevation model from the digital elevation model. Filtering the digital elevation model to generate a filtered digital elevation model may include removing, from the digital elevation model, the data points that are outliers or noise.

The input raster elevation datasets created from lidar point clouds often contain noise introduced during the raster creation process. To remove the noise data points and enhance features of our interest, such as furrows or local depressions, a nonlinear filtering of the elevation values may be performed.

In an embodiment, filtering of the topography data begins by reading the input bare earth digital elevation model. The mean slope of the raw input digital elevation model is computed to determine whether the terrain is steep (slope≥5°) or not (slope≤5°). The slope steepness threshold value can be modified if desired. If the terrain is steep, then a geometric curvature method is used to filter the data. Otherwise, a Laplacian curvature method is used to filter the data.

When analyzing high resolution topography data to extract various features of interest, the filtering may be performed to regularize the elevation data. This may include removing the unwanted data points to reduce the small-scale surface variability, while maintaining and enhancing the features of interest. In the case of channel network extraction, this may allow filtering out the bumpiness of the ground, while preserving the features such as sharp channel banks.

In an embodiment, the filtering is performed using a filter that is expressed using the following linear diffusion equation:

$$\frac{\partial z(x, y, t)}{\partial t} = \nabla \cdot (c \nabla h) \qquad (17)$$

where z (x, y, t) is the elevation data at time t, c is the diffusion coefficient, and ∇ is the gradient operator. The linear diffusion equation is isotropic as the diffusion coefficient c is constant in space and time. While simple to apply, this may result in blurring the terrain edges and losing the sharpness and localization of the terrain's features.

A diffusion filter expressed in equation (17) may be configured to smooth irregularities, such as noise data points, while retaining the features of interest, by defining the diffusion coefficient c as a function of space and time. This operation results in a nonlinear diffusion equation:

$$\frac{\partial z(x, y, i)}{\partial i} = \nabla \cdot [c(x, y, i) \nabla z] \qquad (18)$$

A dimensionless form of the nonlinear diffusion equation (18) may be used with a dimensionless diffusion coefficient c and a time parameter scaled by diffusion. This may be expressed in $L^2$ units, wherein i denotes the number of filtering iterations performed on the image in equation (18). Two possible forms of the diffusion coefficient are:

$$c = e^{(-(|\nabla z|/\lambda)^2)} \qquad (19)$$

$$c = \frac{1}{1 + \left(\frac{|\nabla z|}{\lambda}\right)^2} \qquad (20)$$

where |∇z| is the absolute value of the elevation gradient at location x, y and time t, and lambda is the edge-stopping threshold computed as the 90th quantile of the gradient distribution.

Equations (19) and (20) are also called edge stopping functions and may be referred to as a PM1 function and a PM2 function, respectively. The PM1 and PM2 promote diffusion within boundaries of the terrain features and allow preserving the features' edges.

Another filtering approach uses a nonlinear diffusion filter that involves convolution of the landscape with a small Gaussian kernel at each time step. This approach may use a filter in which the time step is set based on the von Neumann stability criterion:

$$\delta t \leq \frac{1}{4}(\delta x)^2 \qquad (21)$$

where δx is the pixel size. Since the time parameter is in diffusion-scaled $L^2$ units, equation (21) is dimensionally consistent.

In step 908, the AIC system extracts slopes and curvatures data from the filtered digital elevation model.

Ridges, hillslopes, and valleys can be identified from high resolution topography data by comparing the probability density function ("pdf") of curvature to the standard Gaussian distribution on a quantile-quantile (qq) plot. The qq-plot indicates whether a sample is drawn from the Gaussian distribution, or how the plot deviates from the Gaussian distribution.

To determine the curvatures data, any of two curvature definitions may be used. A first definition is the Laplacian y defined as the gradient of the elevation gradient ∇z:

$$\gamma = \nabla^2 z \qquad (22)$$

A second definition is the geometric curvature κ defined as:

$$\kappa = \nabla \cdot (\nabla z / |\nabla z|) \qquad (23)$$

where the elevation gradient is normalized by its magnitude. The gradients are estimated with a central difference operator, except at the edges where a single-sided difference is used.

The geometric curvature is more effective in identifying convergent features in natural landscapes than the Laplacian approach. On the other hand, the Laplacian approach performs better than the geometric curvature approach for terrains that include engineered areas with a mixture of natural channels and artificial features such as ditches and roads.

In step 910, the AIC system determines flow accumulation data based on the filtered digital elevation data. The flow accumulation data may include flow information such as the locations of the flows, their depths, their water velocity, and so forth.

In step 912, the AIC system determines watershed data and subfield geometry data. The watershed data may include information about watersheds. This may include locations of the watersheds, and characteristics of the watersheds.

In step 804, the AIC system executes shallow water equations and kinematic wave equations over the subfield geometry data. Step 804 is described in detail in FIG. 8A.

In step 820, the AIC system generates an overland flow model for the field. Step 820 is described in detail in FIG. 8A.

In step 824, the AIC system updates the overland flow model based on the precipitation and infiltration data. This step is performed if the precipitation and infiltration data has not been used to generate the overland flow model already. However, if the precipitation and infiltration data has been already used to generate the overland flow model, then step 824 is omitted.

Steps 826-830 provide an example application of using the overland flow model for the field. The example application allows querying the system for a moisture level or a nitrogen level for a particular point in the field and generating an answer to the query based on the data stored in the overland flow model. Steps 826-830 are described in FIG. 8A.

4. Example Applications

FIG. 10 is a block diagram that illustrates an example computer system configured to generate and display graphical user interface configured to interact with a subfield moisture modeling tool. The depicted computer system includes a subfield moisture modeling tool 1000 and a graphical user interface 1010. The depicted computer system also includes one or more computer-based processors (not depicted in FIG. 10), one or more memory units (not depicted in FIG. 10), and one or more storage devices (not depicted in FIG. 10).

Subfield moisture modeling tool 1000 includes all, or at least some, components 702-726 that are described in detail in FIG. 7. The tool may be generated by executing software applications on the processors of the computer system. The tool may be stored as an executable program, a web-based application, an application served from a server, an application served from a cloud storage system, and the like.

Graphical user interface 1010 is an interface generated to provide interactivity with subfield moisture modeling tool 1000. Graphical user interface 1010 may be used to facilitate entering a query to subfield moisture modeling tool 1000, and obtaining, from subfield moisture modeling tool 1000, a response to the query. Graphical user interface 1010 may be a component that is separate from subfield moisture modeling tool 1000, as depicted in FIG. 10. Alternatively, graphical user interface 1010 may be a component of subfield moisture modeling tool 1000.

In an embodiment, graphical user interface 1010 is configured to generate and display graphical objects that may be used to provide queries to subfield moisture modeling tool 1000. The queries may include requests for specific information for particular areas of an agricultural field, particular points of the field, particular zones of the fields, and the like. Examples of the queries may include a query 1030 for moisture level information for a particular point in the field, and a query 1050 for nitrogen level data for a particular point in the field.

Graphical user interface 1010 may be configured to communicate the received queries to subfield moisture modeling tool 1000, and upon receiving responses to the queries, communicate the received responses to requestors. For example, in response to receiving moisture level data for a particular point, graphical user interface 1010 may display the moisture level data response 1040 on a display device. According to another example, in response to receiving nitrogen level data for a particular point, graphical user interface 1019 may display the nitrogen level data response 1060 on a display device.

Graphical user interface 1010 may be configured to receive, from subfield moisture modeling tool 1000 various notifications and to display the notification on display devices. For example, graphical user interface 1010 may be configured to receive notifications indicating standing water present in a particular subfield, and in response to receiving the notifications, display the notification 1020 on a display device.

5. Benefits of Certain Embodiments

In an embodiment, the overland flow model is used to improve predictions of hydrologic fluxes in agricultural fields. Furthermore, it may be used to provide notifications of standing water events following strong rainfalls. It may also be used to generate warnings to avoid locations susceptible to ponding during breeding trials. Moreover, the model output layer may be used as a covariate in scripting tools used to generate agricultural prescription for the fields. Examples of agricultural prescriptions include a seed density prescription, a hybrid selection prescription, and a nitrogen fertilizer prescription. It may also be used to explain variabilities in crop yields between wet and dry years, and to explain how the variability relates to subfield moisture of the soil.

Using the techniques described herein, a computer may generate and make available moisture level information for the soil in an agricultural field with the accuracy and efficiency that otherwise is not achievable. For example, without the presented techniques, a complex model requiring a large amount of initial input would be required to capture all aspects of a moisture level information for high-granularity topographical maps of the field. Thus, the techniques described herein improve upon previous moisture level modeling techniques by reducing the amount of data required to generate accurate moisture level information, increasing the efficiency with which the digital models of moisture levels for the soil are run, and increasing the locational accuracy of the moisture level information.

6. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented data processing method for generating overland flow models, the method comprising:
   executing a plurality of shallow water calculations using a depth-averaged integration over subfield geometry data to determine surface water depth data, surface water velocity data, and surface water discharge data for an agricultural field;
   executing hardware-implemented kinematic wave approximation equations, over a 2D grid of the subfield geometry data, the surface water depth data, the surface water velocity data, and the surface water discharge data to generate an overland flow model that includes moisture levels for the agricultural field; and
   based on, at least in part, the overland flow model, generating and causing displaying a visual graphical image of the agricultural field comprising a plurality of color pixels having color values corresponding to the moisture levels determined for the agricultural field.

2. The method of claim 1, wherein output of the overland flow model is provided to a control computer of a fertilizer spreader, dispatched in the agricultural field, to adjust nitrogen application instructions executed by the fertilizer spreader for applying fertilizers to the agricultural field.

3. The method of claim 2, wherein the output of the overland flow model is provided to an irrigation control computer of an irrigation system installed in the agricultural field to adjust watering settings and amounts of water sprayed over the agricultural field.

4. The method of claim 2, wherein the output of the overland flow model is provided to control computers of planters or seeders, dispatched in the agricultural field, to adjust amounts of seeds to be planted in the agricultural field.

5. The method of claim 2, wherein the output of the overland flow model is provided to control computers of planters, seeders, harvesters, combines or cultivators, dispatched in the agricultural field, to control paths within the agricultural field that the planters, seeders, harvesters or cultivators follow as they plant seeds or harvest crops;
    wherein the output of the overland flow model is provided to an intelligence computer system to generate agricultural prescriptions, status reports, summaries, or other field-specific documents.

6. The method of claim 1, further comprising:
receiving digital field geometry data specifying a geometry of the agricultural field;
based at least in part on the digital field geometry data, determining digital elevation model data for the agricultural field;
based at least in part on the digital elevation model data, determining filtered digital elevation model data;
extracting, from the filtered digital elevation model data, slope data and curvature data that represent physical topographical features of the agricultural field; and
based at least in part on the filtered digital elevation model data, determining watershed data representing one or more watersheds and determining the subfield geometry data of the agricultural field.

7. The method of claim 1, wherein the plurality of shallow water calculations and wave calculations include one or more kinematic wave calculations and one or more shallow water calculations;
    wherein the one or more kinematic wave calculations are performed using one or more of: a finite volume method or an accelerator-based multi-core graphics processing unit ("GPU")-based method.

8. The method of claim 1, further comprising:
based on, at least in part, the overland flow model, determining that any standing water subarea is present in the agricultural field;
in response to determining, based on the overland flow model, that one or more standing water subareas are present in the agricultural field:
    generating one or more standing water notifications indicating the one or more standing water subareas present in the agricultural field; and
    generating and causing displaying a standing water visual graphical image of the one or more standing water subareas present in the agricultural field including standing water subarea color pixels having color values corresponding to the one or more standing water subareas.

9. The method of claim 1, further comprising:
receiving a first request for providing a first soil moisture level value for a first subarea of the agricultural field;
based on, at least in part, the overland flow model, determining the first soil moisture level value for the first subarea of the agricultural field; and
generating and causing displaying a first subarea visual graphical image of the first subarea of the agricultural field including first subarea color pixels corresponding to the first soil moisture level value for the first subarea.

10. The method of claim 1, further comprising:
receiving a second request for providing a first nitrogen level value for a second subarea of the agricultural field;
based on, at least in part, the overland flow model, determining the first nitrogen level value for the second subarea of the agricultural field; and
generating and causing displaying a second subarea visual graphical image of the second subarea of the agricultural field including second subarea color pixels corresponding to the first nitrogen level value for the second subarea.

11. The method of claim 1, further comprising:
at a plurality of different times, determining soil moisture levels for the plurality of different times, and repeating the receiving, the executing, and the generating and causing displaying the visual graphical image of the agricultural field including the color pixels corresponding to the soil moisture levels for a plurality of different times.

12. The method of claim 1, wherein the subfield geometry data for the agricultural field is digitally stored as a high-resolution geometry map sampled at any type of resolution.

13. The method of claim 1, wherein the overland flow model provides a same-day distribution of water fluxes across a surface of the agricultural field and a multi-date distribution of shallow groundwater across the agricultural field.

14. One or more non-transitory computer-readable storage media storing one or more sequences of instructions which, when executed by one or more processors, cause the one or more processors to perform:
executing a plurality of shallow water calculations using a depth-averaged integration over subfield geometry data to determine surface water depth data, surface water velocity data, and surface water discharge data for an agricultural field;
executing hardware-implemented kinematic wave approximation equations, over a 2D grid of the subfield geometry data, the surface water depth data, the surface water velocity data, and the surface water discharge data to generate an overland flow model that includes moisture levels for the agricultural field; and
based on, at least in part, the overland flow model, generating and causing displaying a visual graphical image of the agricultural field comprising a plurality of color pixels having color values corresponding to the moisture levels determined for the agricultural field.

15. The non-transitory computer-readable storage media of claim 14, wherein output of the overland flow model is provided to a control computer of a fertilizer spreader, dispatched in the agricultural field, to adjust nitrogen application instructions executed by the fertilizer spreader for applying fertilizers to the agricultural field.

16. The non-transitory computer-readable storage media of claim 15, wherein the output of the overland flow model is provided to an irrigation control computer of an irrigation system installed in the agricultural field to adjust watering settings and amounts of water sprayed over the agricultural field.

17. The non-transitory computer-readable storage media of claim 14, further comprising sequences of instructions which, when executed, cause the one or more processors to perform:
receiving digital field geometry data specifying a geometry of the agricultural field;
based at least in part on the digital field geometry data, determining digital elevation model data for the agricultural field;
based at least in part on the digital elevation model data, determining filtered digital elevation model data;
extracting, from the filtered digital elevation model data, slope data and curvature data that represent physical topographical features of the agricultural field; and
based at least in part on the filtered digital elevation model data, determining watershed data representing one or more watersheds and determining the subfield geometry data of the agricultural field.

18. The non-transitory computer-readable storage media of claim 14, wherein the plurality of shallow water calculations and wave calculations include one or more kinematic wave calculations and one or more shallow water calculations; and
wherein the one or more kinematic wave calculations are performed using one or more of: a finite volume method or an accelerator-based multi-core graphics processing unit ("GPU")-based method.

19. The non-transitory computer-readable storage media of claim 14, further comprising sequences of instructions which, when executed, cause the one or more processors to perform:
based on, at least in part, the overland flow model, determining that any standing water subarea is present in the agricultural field;
in response to determining, based on the overland flow model, that one or more standing water subareas are present in the agricultural field:
generating one or more standing water notifications indicating the one or more standing water subareas present in the agricultural field; and
generating and causing displaying a standing water visual graphical image of the one or more standing water subareas present in the agricultural field including standing water subarea color pixels having color values corresponding to the one or more standing water subareas.

20. The non-transitory computer-readable storage media of claim 14, further comprising sequences of instructions which, when executed, cause the one or more processors to perform:
receiving a first request for providing a first soil moisture level value for a first subarea of the agricultural field;
based on, at least in part, the overland flow model, determining the first soil moisture level value for the first subarea of the agricultural field; and
generating and causing displaying a first subarea visual graphical image of the first subarea of the agricultural field including first subarea color pixels corresponding to the first soil moisture level value for the first subarea.

21. The non-transitory computer-readable storage media of claim 14, further comprising sequences of instructions which, when executed, cause the one or more processors to perform:
receiving a second request for providing a first nitrogen level value for a second subarea of the agricultural field;
based on, at least in part, the overland flow model, determining the first nitrogen level value for the second subarea of the agricultural field; and
generating and causing displaying a second subarea visual graphical image of the second subarea of the agricultural field including second subarea color pixels corresponding to the first nitrogen level value for the second subarea.

22. The non-transitory computer-readable storage media of claim 14, further comprising sequences of instructions which, when executed, cause the one or more processors to perform:
at a plurality of different times, determining soil moisture levels for the plurality of different times, and repeating the receiving, the executing, and the generating and causing displaying the visual graphical image of the agricultural field including the color pixels corresponding to the soil moisture levels for a plurality of different times.

23. The non-transitory computer-readable storage media of claim 14, wherein the subfield geometry data for the agricultural field is digitally stored as a high-resolution geometry map sampled at any type of resolution.

24. The non-transitory computer-readable storage media of claim 14, wherein the overland flow model provides a same-day distribution of water fluxes across a surface of the agricultural field and a multi-date distribution of shallow groundwater across the agricultural field.

* * * * *